Aug. 30, 1949.　　　　　M. COZZOLI　　　　2,480,322
AIRCRAFT AMBULANCE
Filed Nov. 9, 1944　　　　　　　　　　2 Sheets-Sheet 1
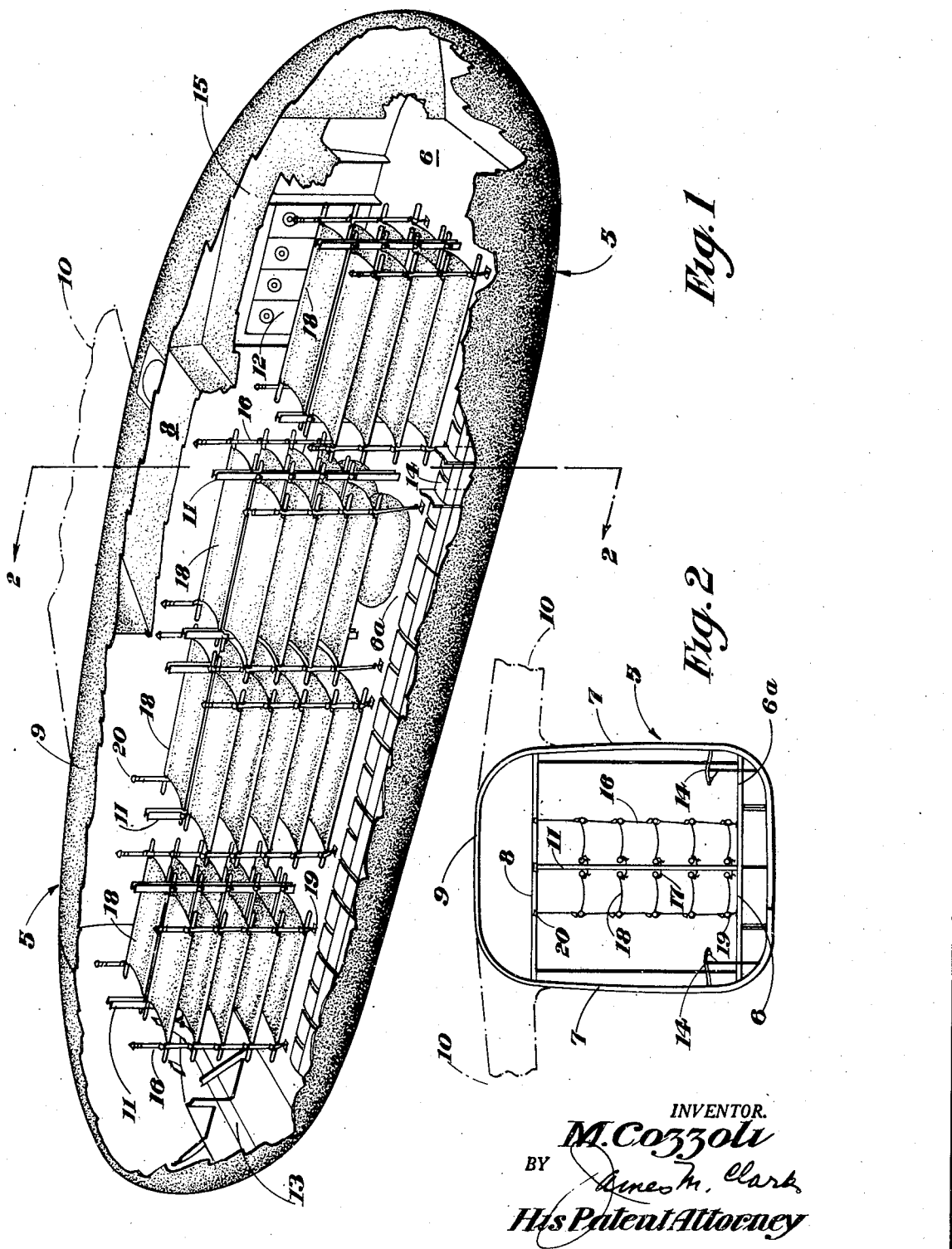
INVENTOR.
M. Cozzoli
BY
His Patent Attorney Aug. 30, 1949.    M. COZZOLI    2,480,322
AIRCRAFT AMBULANCE
Filed Nov. 9, 1944    2 Sheets-Sheet 2

INVENTOR.
M. Cozzoli
BY
His Patent Attorney

Patented Aug. 30, 1949

2,480,322

UNITED STATES PATENT OFFICE 2,480,322

AIRCRAFT AMBULANCE

Michael Cozzoli, Hagerstown, Md., assignor to Fairchild Engine and Airplane Corporation, a corporation of Delaware Application November 9, 1944, Serial No. 562,620

4 Claims. (Cl. 244—118)

1

The present invention relates to the general subject of passenger accommodations in aircraft and like vehicles, and more particularly to improvements in the arrangement and suspension of litters or stretchers in airplane ambulances.

It has been found advantageous in the treatment of civilian and military casualties to evacuate the wounded as rapidly as possible from the battle areas to hospitals at considerable distances from the scene of action where better facilities are available for adequate treatment. Prior to the advent of air ambulances and front line airfields war casualties were by necessity treated at improvised hospitals relatively close to the lines and transfer to base or other more remotely located hospitals meant long and tedious travel by such slow moving ambulance facilities as motor vehicles, railroad trains or steamships. Remarkable progress has been made in reducing the death rate and suffering among such casualties and in aiding the recovery of the more seriously wounded by the provision of air ambulances of larger types having relatively great range capable of transferring wounded rapidly to distant hospitals and even from one continent to another. The present invention is directed to improved air ambulances of the type referred to and more particularly to the arrangement and suspension of the litters or stretchers within the airplane.

It is an object of the present invention to provide an airplane ambulance of an improved type having a novel arrangement of the litters therein by which economical use is made of available space, the wounded may be quickly transferred to and from their position in the airplane and in which each litter is readily accessible for the treatment or transfer of the occupant. It is a further object to provide a novel suspension arrangement for the litters or stretchers in such airplane ambulances by means of which these litters may be arranged in tiers or in superimposed relationship. A further object resides in a novel strap and fitting assembly for the suspension means providing for the ready removability of the litters while at the same time insuring a steady and safe support for the same. Further objects and advantages of the present invention reside in the novel relationship of the several parts as well as in the specific details.

Other objects and advantages will occur to those skilled in the art after reading the present description taken together with the accompanying drawings forming a part hereof, in which:

Fig. 1 is a perspective view of the fuselage of an airplane ambulance embodying the present invention with a portion of the skin cut away to show the litter installation within the fuselage interior;

Fig. 2 is a transverse cross sectional view of the litter installation shown in the fuselage in Fig. 1 as viewed looking rearwardly in the direction 2—2 of Fig. 1.

Figure 3:
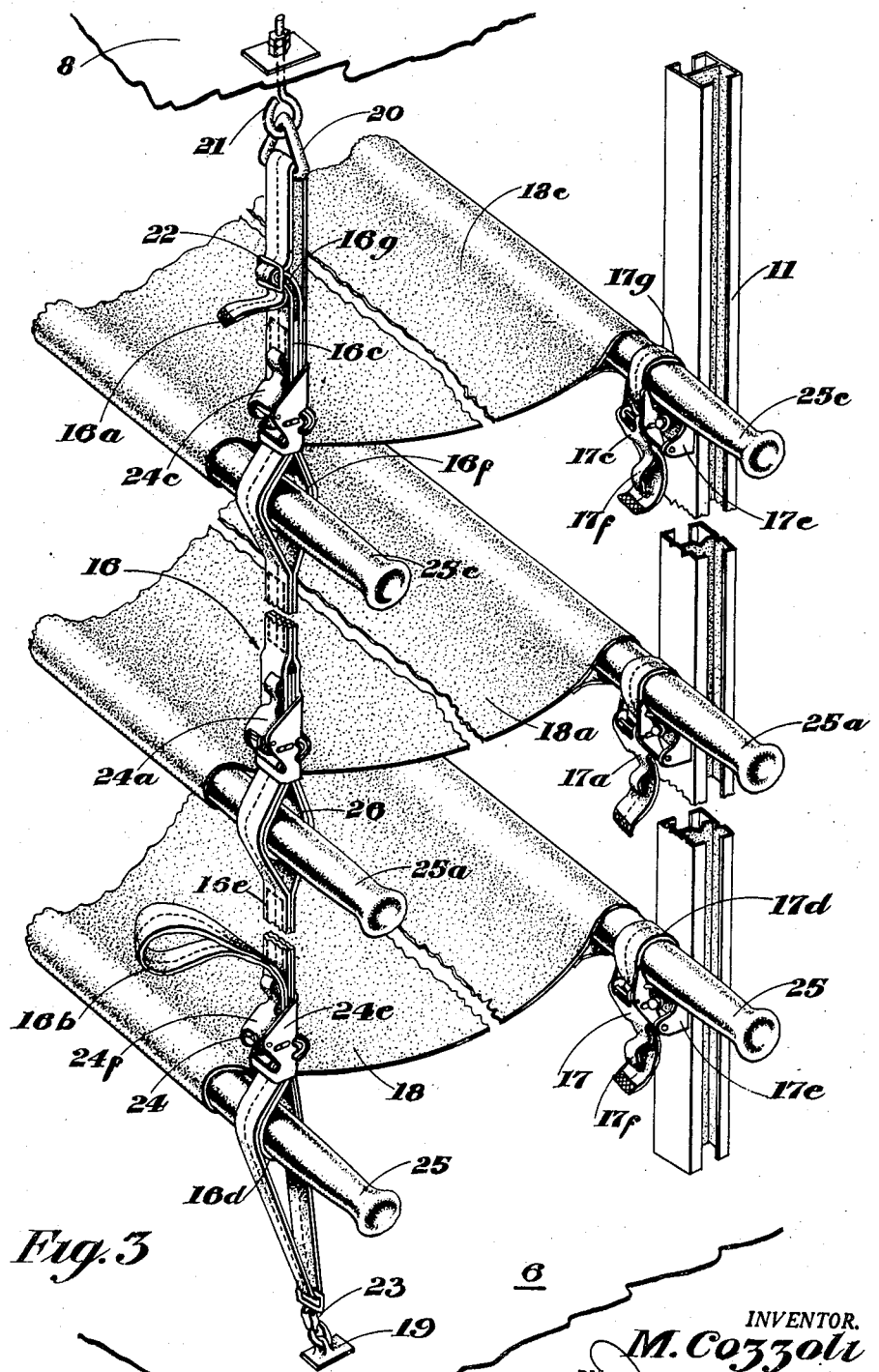
Fig. 3 is an enlarged detail of the suspension arrangement of a tier of litters showing their attachment to the adjacent supporting structure.

Referring now to Figs. 1 and 2 in which there is disclosed perspective and cross sectional views, respectively, of an airplane fuselage 5, having a main deck or floor 6, substantially vertical side walls 7, and an upper or ceiling structure 8 spaced below the fuselage roof or upper portion 9. The numeral 10 indicates in construction lines the wing of the airplane which, for purposes of the present description only, is a cargo type aricraft having its empennage or tail portion supported upon twin booms (not shown) carried upon the wings 10 and spaced rearwardly of the fuselage 5. This type airplane has the advantage of providing an unobstructed rear or aft end portion of the fuselage which may be provided with a large loading door 13 in addition to the forwardly located side doors 12. The present invention is not, however, limited to the type of aircraft shown and described, but is also adapted to fuselages in which the empennage is supported directly upon the rear portion of the fuselage. The airplane in which the present invention is embodied is preferably, however, one which is provided with a nose wheel or tricycle landing gear such that the floor 6 of the fuselage is maintained at all times in a horizontal position, parallel to the ground.

As shown in Figs. 1 and 2 the fuselage 5 is provided with a central row of posts or columns 11 extending between the floor 6 and the ceiling 8 and disposed along the center line, or plane of symmetry of the fuselage. Laterally spaced from each post 11 there are provided suspension strap assemblies 16 extending vertically from the floor 6 to the ceiling 8 and adapted, in cooperation with bracket fittings 17 upon the posts 11, to support the superimposed sets of litters or stretchers 18. Rows of inwardly facing seats 14 are preferably provided along the side walls 7 providing longitudinal aisles 6a between the seats and the sides of the litters. A pilot's compartment is preferably provided at 15 in the nose portion of the airplane for the accommodation of the flight and operating personnel.

Referring now to the enlarged detail of the litter suspension in Fig. 3 there is shown the main suspension strap assembly 16 which comprises a single continuous loop extending from the eye fitting 19 attached to the floor, upwardly to the bar or D-ring fitting 20 suspended from the attachment ring 21, fixed to the ceiling structure 8. The strap 16 is preferably of canvas or duck material, although it may also be of leather, wire cable, rope or other flexible material. It extends from its open end portion 16a, adjacent the ceiling fixture, through an adjustment buckle 22 and the suspension fitting 20, extending thence downwardly substantially vertically through the snap ring loop 23 attached to the eye fitting 19 at the floor; thence the strap 16 extends upwardly through the lower adjustment clamp fitting 24 into a loop portion 16b which returns downwardly through the clamp 24 to provide a suspension loop 16d for the lower litter handle 25. The strap 16 extends from its loop 16d upwardly again through the clamp 24, being stitched to its downwardly extending portion or run at 16e above which it is again separated to receive the intermediate secondary strap 26 which is sewed to the inside of the main strap forming a loop for the outer handle 25a of the intermediate litter 18a. The strap 16 continues upwardly through the adjacent adjusting clamp 24a, being stitched to both the secondary strap 26 and the adjacent downwardly extending portion of the main strap to a point below the outer handle 25c of the uper litter, at which it again separates extending around the handle through the adjacent clamp fitting 24c; it then extends upwardly through the adjusting buckle 22, thence downwardly to return through the fitting 24c, forming a suspension loop 16f around and beneath the handle 25c; it then returns upwardly through the clamp fitting 24c with its end 16c stitched to the adjacent runs of the strap between the fittings 22 and 24c. It will accordingly be noted that the entire suspension assembly is comprised of but a single strap 16 with the exception of the short secondary strap 26 for the support of the intermediate litter or litters. Accordingly the main strap 16 provides its own loop for the upper and lower litters and secondary straps of the nature of 26 are provided for the intermediate litters.

The main strap suspended from the fitting 20 has its tension adjusted by the adjustment buckle 22 and supports the upper litter handle 25c in its loop 16f. The adjustment clamp fittings 24, 24a and 24c are comprised essentially of a frame or body portion 24e and a pivotally mounted thumb latch or lever portion 24f. The body portion of the fitting 24 is adapted to be slid upwardly or downwardly around the combined thicknesses of the strap 16, and when pushed down over the straps to the litter handle to keep the latter securely in the loop the thumb latch is rotated and an eccentric portion causes the several thicknesses of the straps or loops to be gripped securely within the fitting. Any number of intermediate straps 26 may be used for additional litters and the bottom litter in any tier is supported by one side of the main strap, forming the loop 16d and the other side of the main strap passing through the snap hook 23 attached to the floor fitting 19 and returning through the clamp 24 to form the adjusting loop 16b.

The inner litter handles 25, 25a and 25c are supported at the center post 11 by means of the combined bracket and clamp fittings 17, 17a and 17c, respectively. These combination fittings are bolted or otherwise fastened to the post 11 and are provided with straps 17d having their free ends passing through the thumb latch or clamping lever 17f which may be similar to the lever element of the adjustment fittings 24 in that it may have an eccentric portion which wedgingly grips the strap as the lever is rotated into the fastening position.

The tiers of litters may be assembled or installed by any one of several different methods. A preferred method is the placing of all of the litters in a single tier upon the floor beneath the position they are to occupy and with the litters stacked or superimposed. The snap rings 23 are then engaged with the floor support fittings 19 at both ends of the litters and the free ends 16a of the straps are then lifted to the ceiling where they are first threaded through the upper attachment fittings 20 and then through the adjustment buckles 22. When the strap ends 16a have been pulled relatively taut through the buckles 22, each of the outer litter handles will have been lifted into its relative position as the result of these outer handles engaging the respective loops in each of the straps. The inner handles of each litter may then be engaged by the supporting fittings 17, strap 17d pulled taut and clamped by the thumb latches 17f. With the clamp fitting 24 in its open position the adjustment loop 16b may then be pulled taut drawing the entire strap assembly tightly into a straight vertical line between its upper and lower support fittings, 20 and 19, respectively. The tier of litters may be disassembled as expeditiously by a reversal of the above assembly method, the straps readily slipping off the ends of the litter handles to permit the litters to be rolled up into relatively compact cargo items for storage, and the straps to be similarly stored within relatively small spaces available in the aircraft.

It will accordingly be noted that a relatively large number of litters may be arranged within the fuselage in superimposed tiers in a layout which is economical of the available space and in which the litters are readily accessible for either the treatment or removal of the occupants. Litter arrangements of the type described are also readily adapted as sleeping berths for the overnight transport of passengers or military personnel. It will also be seen that the litter suspension utilizes a relatively light, quickly installed assembly which is simple, economical and easily stored within a limited space in the airplane. The present equipment also has the distinct advantage that it is adapted for use with a wide variety of sizes or shapes of litter handles and provides equipment of a flexible nature which has been found extremely desirable in medical and military use. Other advantages, forms and uses of the present invention which may occur to those skilled in the art after reading the present specification, both in respect to the general arrangement and the details of the several parts, are all intended to come within the scope and spirit of applicant's invention as more particularly defined in the appended claims.

I claim:

1. In an aircraft ambulance including: an elongated aircraft fuselage: said fuselage having substantially straight vertical side walls: a rear access door extending across the width of said fuselage: a floor structure within said fuselage arranged to assume a horizontal attitude while the aircraft is upon the ground: and an overhead structure vertically spaced from said floor structure; a longitudinal row of centrally disposed vertical posts extending between said floor and overhead structures; vertically spaced attachment means carried by said posts; flexible suspension members extending vertically between said floor and overhead structures and laterally spaced on both sides of said central posts; said suspension members being inwardly and laterally spaced from the said side walls of said fuselage to provide longitudinal access aisles between said suspension members including a pair of strap portions separated at vertically spaced intervals to form supporting loops; a plurality of longitudinal rows of superposed vertically aligned litters having extending handle portions releasably supported within the supporting loops of said suspension members and said post attachment means; adjustment means carried by said suspension members for the tightening of said members between said floor and overhead structures and about said supporting loops to restrain the said vertically aligned litter handle portions within said supporting loops from movement; said adjustment means arranged to cooperate with said vertically disposed suspension members to prevent imparting lateral forces to said litters tending to disturb said litters and to stress said post attachments upon tightening of said adjustment means; said rear access door, longitudinal access aisles and central longitudinal arrangement of said litters cooperating to facilitate the carrying of occupants on said litters to and from the litter suspension positions by direct longitudinal movement from said rear access door through either said longitudinal aisle and by lateral movement into the supported position upon said posts and said suspension members without the necessity of turning and twisting said litters in such carrying movement.

2. The improved arrangement in an aircraft ambulance including: an elongated fuselage: a floor structure within said fuselage arranged to assume a horizontal attitude while the aircraft is upon the ground: and an overhead structure vertically spaced from said floor structure; of a longitudinal row of centrally disposed vertical posts within said fuselage along its plane of symmetry extending between said floor and overhead structures; vertically spaced attachment means carried by said posts; flexible suspension members extending vertically between said floor and overhead structures and spaced on both sides of said central row of posts; said suspension members including strap portions separated at vertically spaced intervals to form supporting loops; a plurality of longitudinal rows of superimposed vertically aligned litters having extending handle portions releasably supported within the supporting loops of said suspension members and said post attachment means; and adjustment means carried by said suspension members for the tightening of said members between said floor and overhead structures and about said supporting loops to support the said vertically aligned litter handle portions within said supporting loops, the central and longitudinal arrangement of said litters with respect to said plane of symmetry arranged such that occupants of said litters are subjected to minimum discomfort due to lateral rolling of the aircraft.

3. The arrangements in an aircraft ambulance including: an elongated fuselage: said fuselage having substantially straight vertical side walls: laterally extending wings attached to said fuselage in the region of its mid-length portions: a floor structure within said fuselage arranged to assume a horizontal attitude while the aircraft is upon the ground: and an overhead structure within said fuselage vertically spaced from said floor structure; of a longitudinal row of centrally disposed vertical posts within said fuselage along its plane of symmetry extending between said floor and overhead structures; said row of posts extending fore and aft of a mid-length position of said fuselage at which said laterally extending wings are attached; vertically spaced attachment means carried by said posts; flexible non-resilient suspension members extending vertically between said floor and overhead structures and laterally spaced on both sides of both said central posts; said suspension members being inwardly and laterally spaced from the said side walls of said fuselage; each said suspension member including a pair of strap portions separated at vertically spaced intervals to form supporting loops; a plurality of longitudinal rows of superimposed vertically aligned litters having extending handle portions releasably supported within the supporting loops of said suspension members and said post attachment means; adjustment means carried by said suspension members for the tightening of said members between said floor and overhead structures and about said supporting loops; the central and longitudinal disposition of said litters with respect to said plane of symmetry and said transversely extending wings being arranged such that disturbances to the occupants of said litters due to lateral rolling and fore-and-aft pitching movements of the aircraft are substantially minimized.

4. In an aircraft ambulance comprising an elongated aircraft fuselage, said fuselage having substantially straight vertical side walls, laterally extending wings attached to said fuselage in the region of its mid-length portion, a rear access door extending across the width of said fuselage, a floor structure within said fuselage arranged to assume a horizontal attitude while the aircraft is upon the ground, and an overhead structure vertically spaced from said floor structure; a longitudinally extending row of centrally disposed vertical posts within said fuselage along its plane of symmetry extending between said floor and overhead structures; vertically spaced attachment means carried by said posts; suspension members extending vertically between said floor and overhead structures and laterally spaced on both sides of said central posts; said suspension members being inwardly and laterally spaced from the said side walls of said fuselage to provide longitudinal access aisles along said side walls; each said suspension member provided at vertically spaced intervals with supporting loops; a plurality of superimposed vertically aligned litters having extending handle portions releasably supported within the supporting loops of said suspension members and said post attachment means; said litters disposed adjacent said plane of symmetry and in the region of said mid-length position of said fuselage; adjustment means carried by said suspension members for the tightening of said members between said floor and overhead structures and about said supporting loops to support said vertically aligned litter handle portions within said supporting loops; said rear access door, said longitudinal access aisles and said litter disposition cooperating to facilitate direct longitudinal movement of said litters from said rear access door through said longitudinal access aisle and lateral movement into the supported position upon said posts and suspension members without the necessity of turning and twisting said litters in such transporting movement; and said litter disposition adjacent said plane of symmetry and in the region of the mid-length position of said fuselage cooperating to provide an arrangement in which the occupants of said litters are subjected to minimum disturbances due to lateral rolling or fore and aft pitching movements of the aircraft.

MICHAEL COZZOLI.

REFERENCES CITED

The following references are of record in the file of this patent:

UNITED STATES PATENTS

| Number | Name | Date |
|---|---|---|
| 665,535 | Lein | Jan. 8, 1901 |
| 713,875 | Hall | Nov. 18, 1902 |
| 1,089,545 | Gosso | Mar. 10, 1914 |
| 1,258,694 | Miller | Mar. 12, 1918 |
| 1,325,320 | Gosso | Dec. 16, 1919 |
| 2,276,236 | Latimer | Mar. 10, 1942 |
| 2,391,051 | Windsor | Dec. 18, 1945 |

FOREIGN PATENTS

| Number | Country | Date |
|---|---|---|
| 1,812 | Great Britain | Jan. 21, 1884 |
| 510,699 | France | Sept. 10, 1920 |

OTHER REFERENCES

Jane's "All the Worlds Aircraft," 1941, page 83c, published by The Macmillan Co., of New York city.

Jane's "All the Worlds Aircraft," 1922, page 60B, published by The Macmillan Co. of New York city.